United States Patent
Li et al.

(10) Patent No.: US 10,853,526 B2
(45) Date of Patent: Dec. 1, 2020

(54) DYNAMIC SCREEN FILTERING

(71) Applicant: LENOVO (Singapore) PTE. LTD., New Tech Park (SG)

(72) Inventors: Scott Wentao Li, Cary, NC (US); Robert James Kapinos, Durham, NC (US); Robert James Norton, Jr., Raleigh, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 158 days.

(21) Appl. No.: 16/127,145

(22) Filed: Sep. 10, 2018

(65) Prior Publication Data
US 2020/0082130 A1 Mar. 12, 2020

(51) Int. Cl.
  G06F 21/84 (2013.01)
  G06F 21/62 (2013.01)
  G06F 3/0488 (2013.01)
  G06F 21/83 (2013.01)

(52) U.S. Cl.
  CPC .......... G06F 21/84 (2013.01); G06F 3/04886 (2013.01); G06F 21/6245 (2013.01); G06F 21/83 (2013.01)

(58) Field of Classification Search
  CPC ...... G06F 21/84; G06F 21/83; G06F 3/04886; G06F 21/6245
  See application file for complete search history.

(56) References Cited

U.S. PATENT DOCUMENTS

| | | | | |
|---|---|---|---|---|
| 6,111,517 A * | 8/2000 | Atick | ................. | G06K 9/00288 340/5.83 |
| 6,529,209 B1 * | 3/2003 | Dunn | ..................... | G06F 21/84 345/629 |
| 7,039,221 B1 * | 5/2006 | Tumey | ............... | G06K 9/00221 382/118 |
| 7,253,791 B2 * | 8/2007 | Kahan | ..................... | G09C 5/00 345/8 |
| 9,588,595 B2 * | 3/2017 | Demopoulos | ......... | G06F 3/0233 |
| 9,977,909 B1 * | 5/2018 | Austin | ................ | G06F 3/04883 |
| 10,440,007 B1 * | 10/2019 | Ramalingam | ......... | G06F 3/0484 |
| 2001/0026248 A1 * | 10/2001 | Goren | ..................... | G06F 21/84 345/7 |
| 2002/0101988 A1 * | 8/2002 | Jones | ..................... | G09C 5/00 380/54 |
| 2003/0108198 A1 * | 6/2003 | Lahiri | ..................... | G06F 21/84 380/54 |
| 2005/0044395 A1 * | 2/2005 | Staring | .................... | G09C 5/00 726/26 |

(Continued)

*Primary Examiner* — J. Brant Murphy
(74) *Attorney, Agent, or Firm* — Kunzler Bean & Adamson

(57) ABSTRACT

Apparatuses, methods, systems, and program products are disclosed for sharing content with a detected device. An apparatus includes a processor and a memory that stores code executable by the processor. The memory stores code executable by the processor to detect that an input field of a graphical display is an active graphical field for receiving input. The memory stores code executable by the processor to dynamically enable an electronic privacy filter for the graphical display. The memory stores code executable by the processor to receive input within the input field while the electronic privacy filter is enabled for the graphical display.

20 Claims, 5 Drawing Sheets

(56) References Cited

U.S. PATENT DOCUMENTS

| | | | |
|---|---|---|---|
| 2005/0117748 A1* | 6/2005 | Schrijen | G06F 21/83 380/200 |
| 2005/0235217 A1* | 10/2005 | Hoe-Richardson | G06F 21/84 715/768 |
| 2006/0056626 A1* | 3/2006 | Keohane | G06F 3/04895 380/206 |
| 2006/0115082 A1* | 6/2006 | Kevenaar | G07D 7/0047 380/216 |
| 2006/0179407 A1* | 8/2006 | Tuyls | G09C 5/00 715/700 |
| 2007/0200927 A1* | 8/2007 | Krenik | A61B 3/036 348/47 |
| 2008/0005035 A1* | 1/2008 | Schwartz | G06F 21/31 705/325 |
| 2009/0185723 A1* | 7/2009 | Kurtz | G06K 9/00926 382/118 |
| 2010/0271396 A1* | 10/2010 | Nemeth | G09B 5/02 345/641 |
| 2012/0133850 A1* | 5/2012 | Broen | G02B 30/34 349/1 |
| 2012/0218187 A1* | 8/2012 | Stewart | G06F 3/021 345/168 |
| 2012/0268827 A1* | 10/2012 | Tiang | G02B 7/006 359/601 |
| 2013/0021240 A1* | 1/2013 | Coulon | G06F 21/6245 345/156 |
| 2013/0051632 A1* | 2/2013 | Tsai | G06K 9/685 382/118 |
| 2013/0067385 A1* | 3/2013 | Demopoulos | G06F 3/0233 715/780 |
| 2013/0091583 A1* | 4/2013 | Karroumi | G06F 3/04886 726/26 |
| 2014/0013422 A1* | 1/2014 | Janus | G06F 21/32 726/19 |
| 2014/0040756 A1* | 2/2014 | Bukurak | G06F 3/04886 715/741 |
| 2016/0224217 A1* | 8/2016 | Kim | G06F 3/0482 |
| 2016/0239680 A1* | 8/2016 | Holz | H04W 12/04 |
| 2017/0142149 A1* | 5/2017 | Coates | G06F 16/285 |
| 2018/0129829 A1* | 5/2018 | Li | G06F 21/84 |
| 2019/0020773 A1* | 1/2019 | Hosoda | G06F 3/1222 |
| 2019/0213336 A1* | 7/2019 | Kundu | G06F 21/604 |
| 2020/0089910 A1* | 3/2020 | Paz | H04L 51/16 |

* cited by examiner

DYNAMIC SCREEN FILTERING

FIELD

The subject matter disclosed herein relates to providing input on a device, and more particularly relates to dynamically enabling an electronic screen filter when input is provided on a device.

BACKGROUND

Graphical displays are used to present and receive information. Information may be received on a graphical display by entering the information into input fields that are presented on the graphical display. The information that is entered in the input fields, however, may be available for viewing by unintended persons.

BRIEF SUMMARY

An apparatus for dynamic screen filtering is disclosed. The apparatus, in one embodiment, includes a processor and a memory that stores code executable by the processor. In one embodiment, the memory stores code executable by the processor to detect that an input field of a graphical display is an active graphical field for receiving input. In a further embodiment, the memory stores code executable by the processor to dynamically enable an electronic privacy filter for the graphical display. In certain embodiments, the memory stores code executable by the processor to receive input within the input field while the electronic privacy filter is enabled for the graphical display.

A method for dynamic screen filtering includes, in one embodiment, detecting, by a processor, that an input field of a graphical display is an active graphical field for receiving input. The method, in some embodiments, includes dynamically enabling an electronic privacy filter for the graphical display. The method, in various embodiments, includes receiving input within the input field while the electronic privacy filter is enabled for the graphical display.

A program product for dynamic screen filtering, in one embodiment, includes a computer readable storage medium that stores code executable by a processor. In some embodiments, the executable code includes code to perform detecting that an input field of a graphical display is an active graphical field for receiving input. The executable code, in certain embodiments, includes code to perform dynamically enabling an electronic privacy filter for the graphical display. The executable code, in certain embodiments, includes code to perform receiving input within the input field while the electronic privacy filter is enabled for the graphical display.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
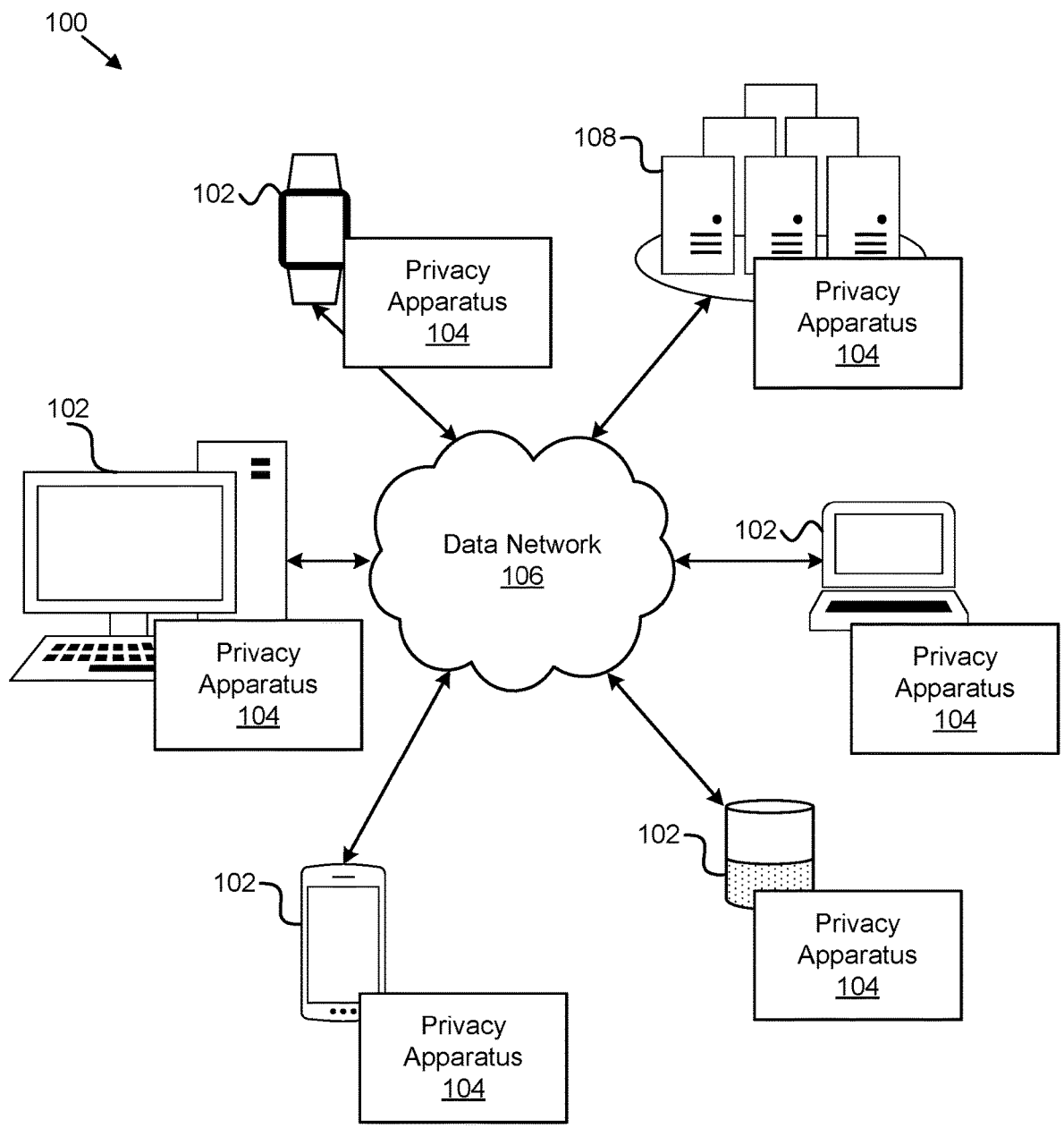
FIG. 1 is a schematic block diagram illustrating one embodiment of a system for dynamic screen filtering.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for dynamic screen filtering is disclosed. The apparatus, in one embodiment, includes a processor and a memory that stores code executable by the processor. In one embodiment, the memory stores code executable by the processor to detect that an input field of a graphical display is an active graphical field for receiving input. In a further embodiment, the memory stores code executable by the processor to dynamically enable an electronic privacy filter for the graphical display. In certain embodiments, the memory stores code executable by the processor to receive input within the input field while the electronic privacy filter is enabled for the graphical display.

In one embodiment, the code is further executable by the processor to prevent receiving input within the input field until the electronic privacy filter is enabled. In certain embodiments, the code is further executable by the processor to disable the electronic privacy filter in response to the input field not being the active graphical field for receiving input. In one embodiment, the code is further executable by the processor to disable the electronic privacy filter in response to the input field comprising entered input not being visible within a display area of the graphical display.

In some embodiments, the input comprises alpha-numeric characters received from at least one of a physical keyboard and an on-screen keyboard. In various embodiments, the code is further executable by the processor to present the on-screen keyboard with scrambled alpha-numeric characters such that the alpha-numeric characters are presented in a layout that is different than a QWERTY keyboard layout. In certain embodiments, the code is further executable by the processor to present a transpose map of a keyboard layout that corresponds to the keys of the physical keyboard such that the alpha-numeric characters are presented in a layout that is different than a QWERTY keyboard layout.

In one embodiment, the code is further executable by the processor to start an enable timer in response to the input field becoming the active graphical field and in response to the electronic privacy filter not currently being enabled. The electronic privacy filter may be enabled in response to expiration of the enable timer. In various embodiments, the code is further executable by the processor to start a disable timer in response to the input field not being the active graphical field. The electronic privacy filter may be disabled in response to expiration of the disable timer and in response to a different input field not becoming the active graphical field.

In some embodiments, the input field comprises an input field for a web page presented within a web browser. In certain embodiments, the input field comprises an input field for an operating system application. In one embodiment, the input field comprises an input field for a command line terminal. In some embodiments, the input field comprises an input field for receiving sensitive information such as a username, a password, financial information, personal identification information, and health information.

A method for dynamic screen filtering includes, in one embodiment, detecting, by a processor, that an input field of a graphical display is an active graphical field for receiving input. The method, in some embodiments, includes dynamically enabling an electronic privacy filter for the graphical display. The method, in various embodiments, includes receiving input within the input field while the electronic privacy filter is enabled for the graphical display.

In one embodiment, the method further includes preventing receiving input within the input field until the electronic privacy filter is enabled. In various embodiments, the method further includes disabling the electronic privacy filter in response to the input field not being the active graphical field for receiving input.

In one embodiment, the input comprises alpha-numeric characters received from at least one of a physical keyboard and an on-screen keyboard. In certain embodiments, the method further includes presenting the on-screen keyboard with scrambled alpha-numeric characters such that the alpha-numeric characters are presented in a layout that is different than a QWERTY keyboard layout. In some embodiments, the method further includes presenting a transpose map of a keyboard layout that corresponds to the keys of the physical keyboard such that the alpha-numeric characters are presented in a layout that is different than a QWERTY keyboard layout.

A program product for dynamic screen filtering, in one embodiment, includes a computer readable storage medium that stores code executable by a processor. In some embodiments, the executable code includes code to perform detecting that an input field of a graphical display is an active graphical field for receiving input. The executable code, in certain embodiments, includes code to perform dynamically enabling an electronic privacy filter for the graphical display. The executable code, in certain embodiments, includes code to perform receiving input within the input field while the electronic privacy filter is enabled for the graphical display.

FIG. 1 is a schematic block diagram illustrating one embodiment of a system 100 for dynamic screen filtering. In one embodiment, the system 100 includes one or more information handling devices 102, one or more privacy apparatuses 104, one or more data networks 106, and one or more servers 108. In certain embodiments, even though a specific number of information handling devices 102, privacy apparatuses 104, data networks 106, and servers 108 are depicted in FIG. 1, one of skill in the art will recognize, in light of this disclosure, that any number of information handling devices 102, privacy apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include a touch-sensitive display that is configured to detect, sense, determine, and/or the like touch input from a user's finger, a stylus, and/or the like.

The information handling devices 102 may be configured to receive input from one or more input sources such as a physical keyboard, an on-screen keyboard, voice input, and/or the like. The information handling devices 102 may include or may be operably coupled to a graphical display such as a touch-sensitive display, an LCD display, an LED display, and/or the like that has an electronic screen filter, described below. In various embodiments, the information handling devices 102 are configured to present one or more input fields for receiving input from a user. The input fields, described in more detail below, may include a terminal console for receiving command line input, a graphical input field that an operating system presents, a graphical input field presented in a web browser as part of a webpage, and/or the like.

In one embodiment, the privacy apparatus 104 is configured to dynamically activate a screen filter while input is entered into an input field that is presented on a graphical display. In one embodiment, the privacy apparatus 104 is configured to detect that an input field of a graphical display is an active graphical field for receiving input, dynamically enable an electronic privacy filter for the graphical display, and receive input within the input field while the electronic privacy filter is enabled for the graphical display. The privacy apparatus 104, including its various sub-modules, may be located on one or more information handling devices 102 in the system 100, one or more servers 108, one or more network devices, and/or the like. The privacy apparatus 104 is described in more detail below with reference to FIGS. 2 and 3.

In one embodiment, the privacy apparatus 104 improves the security for entering input into graphical input fields. For instance, without the privacy apparatus 104, the information that a user enters in a graphical input field could be viewed by unintended parties. For example, an unintended party may watch as a user enters his/her username and password into input fields presented on a website to steal the user's credentials. Some input fields may attempt to mask the entered information, but not all input fields are configured to mask the entered information, may be configured to mask certain types of information (e.g., an input field for a password may mask the entered information while an input field for a username may not mask the information), or may not be configured to mask the information at all. Thus, there is inconsistencies among different input fields for web browsers, operating system, and lower-level input fields such as a command-line terminal. The privacy apparatus 104 enhances or provides a secure way to enter information into input fields by reducing the amount of the graphical display that is viewable, e.g., by reducing the viewing angle using an electronic screen filter that is dynamically enabled when an input field is activated on a graphical display.

In various embodiments, the privacy apparatus 104 may be embodied as a hardware appliance that can be installed or deployed on an information handling device 102, on a server 108, or elsewhere on the data network 106. In certain embodiments, the privacy apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the privacy apparatus 104 may include a power interface, a wired and/or wireless network interface, a graphical interface that attaches to a display, and/or a semiconductor integrated circuit device as described below, configured to perform the functions described herein with regard to the privacy apparatus 104.

The privacy apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a micro-controller, an application-specific integrated circuit ("ASIC"), a processor, a processor core, or the like. In one embodiment, the privacy apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the privacy apparatus 104.

The semiconductor integrated circuit device or other hardware appliance of the privacy apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the privacy apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

Figure 2:
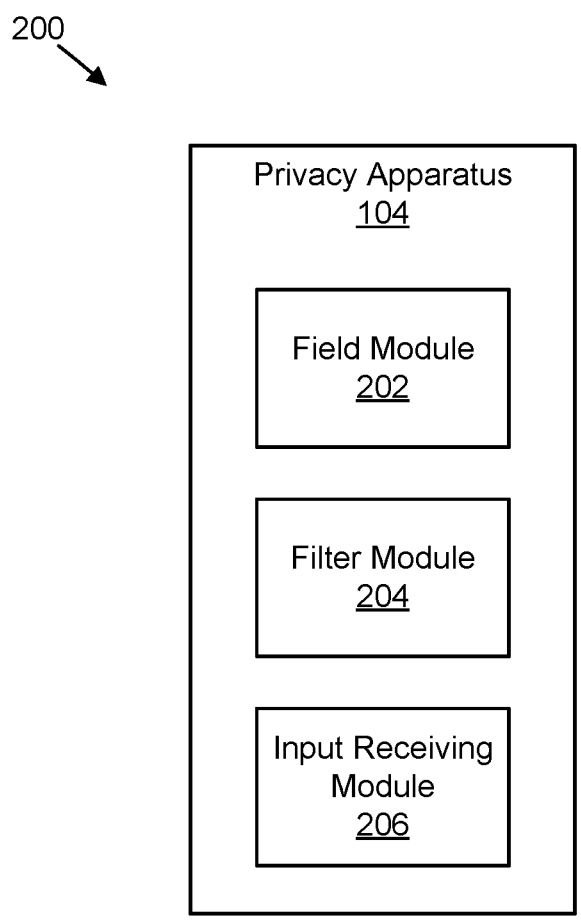
FIG. 2 is a schematic block diagram illustrating one embodiment of an apparatus for dynamic screen filtering.

FIG. 2 is a schematic block diagram illustrating one embodiment of an apparatus 200 for dynamic screen filtering. In one embodiment, the apparatus 200 includes an embodiment of a privacy apparatus 104. The privacy apparatus 104, in some embodiments, includes one or more of a field module 202, a filter module 204, and an input receiving module 206, which are described in more detail below.

The field module 202, in one embodiment, is configured to detect that an input field of a graphical display is an active graphical field for receiving input. As described above, the input field may comprise a graphical element for receiving user input such as a username, a password, credit card or other financial information, personal identification information (e.g., an address, a phone number, a name, a PIN number, a social security number, etc.), health information, and/or the like.

The field module 202, in certain embodiments, detects that an input field is an active input field in response to detecting or receiving a trigger, signal, message, notification, and/or the like in response to a key event (e.g., tabbing to an input field), a mouse event (e.g. hovering or clicking on an input field), a touch event (e.g., selecting an input field with a finger or stylus), and/or the like.

In one embodiment, the input field may include an input field on a web page, an input field for an operating system or an application executing in the operating system, an input field as part of a command-line terminal, and/or the like. In certain embodiments, the field module 202 may identify, determine, detect, and/or the like an input field based on identifiers for the input field. For instance, in a web page, the markup of the webpage, e.g., the HTML code may include tags or other identifiers that indicate an input field on the webpage. Similarly, an input field for an operating system or an application executing in an operating system may be assigned a graphical user interface identifier ("GUID") that identifies the input field. For a command-line interface, the field module 202 may detect when the cursor is waiting for input from a user.

In certain embodiments, the filter module 204 is configured to dynamically enable an electronic privacy filter for the graphical display in response to the field module 202 detecting that an input field of the graphical display is an active graphical field for receiving input. As used herein, an electronic privacy filter may be a digital screen filter for a graphical display that reduces the viewing angle of the graphical display so that information presented on the graphical display is not visible to persons who are attempting to view information on the display from the side or periphery of the graphical display. For instance, the electronic privacy filter may use a combination of a backlight, a light control film within the display, and other hardware and logic controls to enable the privacy filter and reduce the viewing angle of the graphical display. The viewing angle, for example, may be reduced from between 170°-180° to about 70° so that only users who are within the 70° viewing angle directly in front of the graphical display can see information presented on the graphical display.

The filter module 204 may automatically enable, activate, turn on, or the like the electronic privacy filter for the graphical display when the field module 202 determines that an input field is the active graphical field on the display for receiving input (e.g., in response to a user clicking, touching, or otherwise selecting an input field such as a text input box), unlike conventional privacy filter systems that may require the user to manually enable an electronic privacy filter or to attach a separate privacy filter to the display. In this manner, the filter module 204 can prevent people from viewing information that a user enters in an input field on the graphical display from the side or from within the blocked viewing angle so that users can enter sensitive information without fear that people next to them will steal, copy, or otherwise misappropriate the information.

In some embodiments, the filter module 204 enables the electronic privacy filter when it detects or determines that an input field is visible on the graphical display, even before the user clicks, touches, or otherwise selects an input field for entering input. For example, if the user browses to a web page in a web browser, the filter module 204 may determine that there are two input fields on the web page, e.g., from parsing the markup language (HTML, JavaScript, XML, etc.) for the webpage, and may then enable the electronic privacy filter to proactively prevent others from viewing the input that the user may enter in the input fields.

In one embodiment, the filter module 204 disables the electronic privacy filter in response to the currently active input field no longer being the active graphical field for receiving input on the graphical display. For instance, if the user enters input into an input field, and the clicks on the display outside of the input field such that the input field is no longer the active graphical field for receiving input, the filter module 204 may disable the electronic privacy filter so that it is not persistently enabled.

In certain embodiments, the filter module 204 disables the electronic privacy filter in response to an input field that is visible on the graphical display and contains input that a user entered no longer being visible on the display. For instance, if the user enters input into a username field and then clicks on a different part of the display such that the username field is not the active graphical field, the filter module 204 may not disable the electronic privacy filter because, even though an input field is not currently the active graphical field on the display, the username input may still be viewable on the display. However, if the user scrolls past the username field, switches to a different browser window, minimizes the web browser, or the like, then the filter module 204 may disable the electronic privacy filter. For example, if a user enters a username into an input field presented in a web browser while the electronic privacy filter is active, and then scrolls down the web page so that the username field is no longer visible on the display, the filter module 204 may then disable the electronic privacy filter 204.

In one embodiment, the input receiving module 206 is configured to receive input within the input field that is the active graphical field of the graphical display. In certain embodiments, the input comprises alpha-numeric characters that are entered using a physical keyboard, an on-screen keyboard, and/or the like. In one embodiment, the input receiving module 206 prevents receiving input in the input field until the electronic privacy filter is enabled.

For example, if a user clicks in an input field to enter input and attempts to type characters before the electronic privacy filter is fully enabled, the input receiving module 206 may not receive the typed characters, e.g. the input receiving module 206 may ignore or disregard the input and may not present the characters in the graphical input field. In some embodiments, the input receiving module 206 may buffer input that is entered by the user prior to the electronic privacy filter being enabled until the electronic privacy filter is enabled, at which point the input receiving module 206 may present the input that the user entered in the input field.

Figure 3:
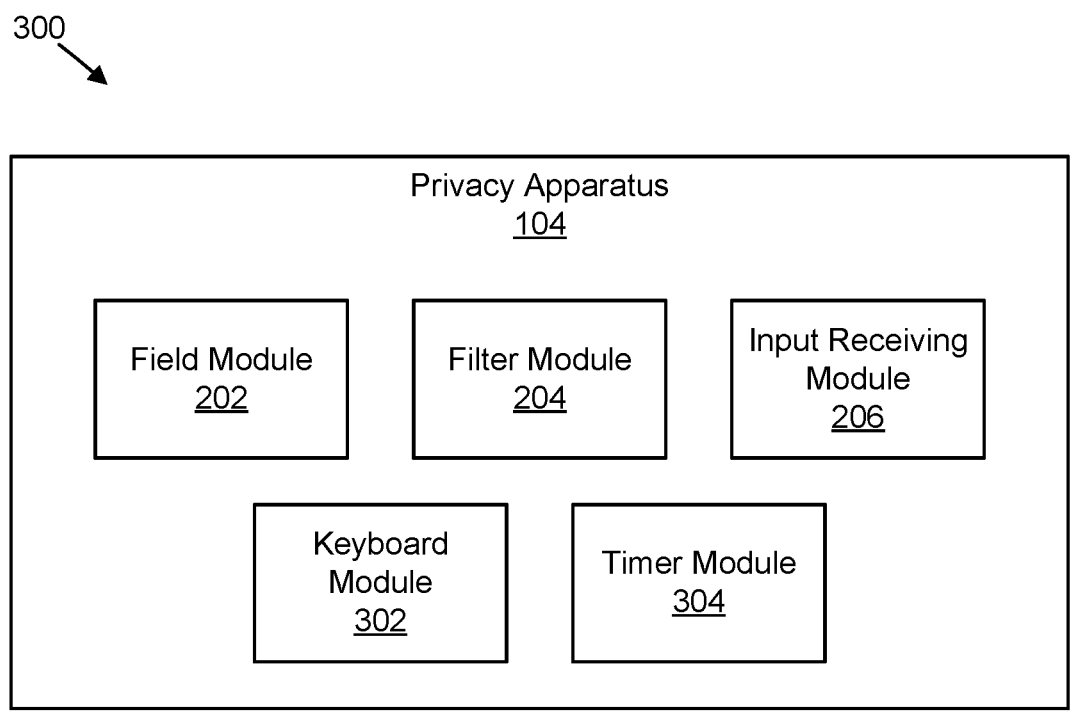
FIG. 3 is a schematic block diagram illustrating one embodiment of another apparatus for dynamic screen filtering.

FIG. 3 is a schematic block diagram illustrating one embodiment of an apparatus 300 for dynamic screen filtering. In one embodiment, the apparatus 300 includes an embodiment of a privacy apparatus 104. The privacy apparatus 104, in some embodiments, includes one or more of a field module 202, a filter module 204, and an input receiving module 206, which may be substantially similar to the field module 202, the filter module 204, and the input receiving module 206 described above with reference to FIG. 2. In further embodiments, the privacy apparatus 104 includes one or more of a keyboard module 302 and a timer module 304, which are described in more detail below.

The keyboard module 302, in one embodiment, is configured to present an on-screen keyboard for receiving touch input from a user for the input field on a touch-enabled display. In certain embodiments, the keyboard module 302 presents the on-screen keyboard with scrambled alpha-numeric characters, e.g., characters that are positioned on the display in a location that is different from the standard QWERTY layout. In certain embodiments, the keyboard module 302 changes the scrambled layout of the characters of the on-screen keyboard so that it is different each time that the on-screen keyboard is presented on the display. In this manner, if a bystander can see the user entering characters using the on-screen keyboard, the bystander will not be able to guess, estimate, or the like the QWERTY characters that the user is pressing based on the location of the user's finger or stylus on the display because the on-screen keyboard layout is different than a standard QWERTY keyboard layout.

The keyboard module 302, in further embodiments, is configured to present a transpose map of a keyboard layout that corresponds to the keys of a physical keyboard that is used to enter input for the input field. In such an embodiment, the keyboard module 302 presents a transpose map that scrambles the characters of the keyboard layout, e.g., of a standard QWERTY keyboard layout, so that a bystander cannot guess, estimate, or the like the keys that the user is entering into the input field. For instance, the keyboard module 302 may present a transpose map where the rows of keys of a keyboard are switched, wherein only a few characters are swapped, where the entire keyboard layout is randomly changed, and/or the like. For example, the keyboard module 302 may present a transpose map where the normal position of the 'Q' character on the QWERTY keyboard is now the 'A' character such that when the user presses the 'Q' key on the keyboard, the input that is received is the 'A' character. The keyboard module 302 may present a different transpose map each time an input field is activated for receiving input.

In one embodiment, the timer module 304 is configured to start an enable timer in response to (1) an input field presented on the graphical display becoming the active input field for receiving input and (2) the electronic privacy filter not currently being enabled. For example, when a user clicks in an input field to enter input in the input field, the timer module 304 may determine whether the electronic privacy filter is currently enabled, and if not, start a timer such that when the timer expires the electronic privacy filter is enabled. The timer may be for a short period of time such as on the order or milliseconds or microseconds. In this manner, if the user is clicking around on the display or inadvertently clicks on an input field and then clicks somewhere else such that the input field is no longer the active input field, the electronic privacy filter will not constantly be enabled and disabled. Instead, the electronic privacy filter may be enabled when an input field is active for a period of time that is indicated by the enable timer.

Similarly, the timer module 304 may be configured to start a disable timer in response to the input field not being the active graphical field. For example, when the user clicks on an area of the display that is not within the currently active input field, the currently active input field may become inactive, e.g., may not be active for receiving input. In such an embodiment, the timer module 304 starts a disable timer such that when the timer expires, the electronic privacy filter that is currently enabled will be disabled. The timer may be for a short period of time such as on the order or milliseconds or microseconds. In further embodiments, the electronic privacy filter is disabled in response to (1) expiration of the disable timer and (2) a different input field not becoming the active graphical field on the display. For instance, if a new input field become the active input field and the current input field becomes an inactive input field, the timer module 304 resets, disables, or ignores the disable timer so that the electronic privacy filter will not be disabled until an input field is no longer the active graphical field for receiving input on the display.

Figure 4:
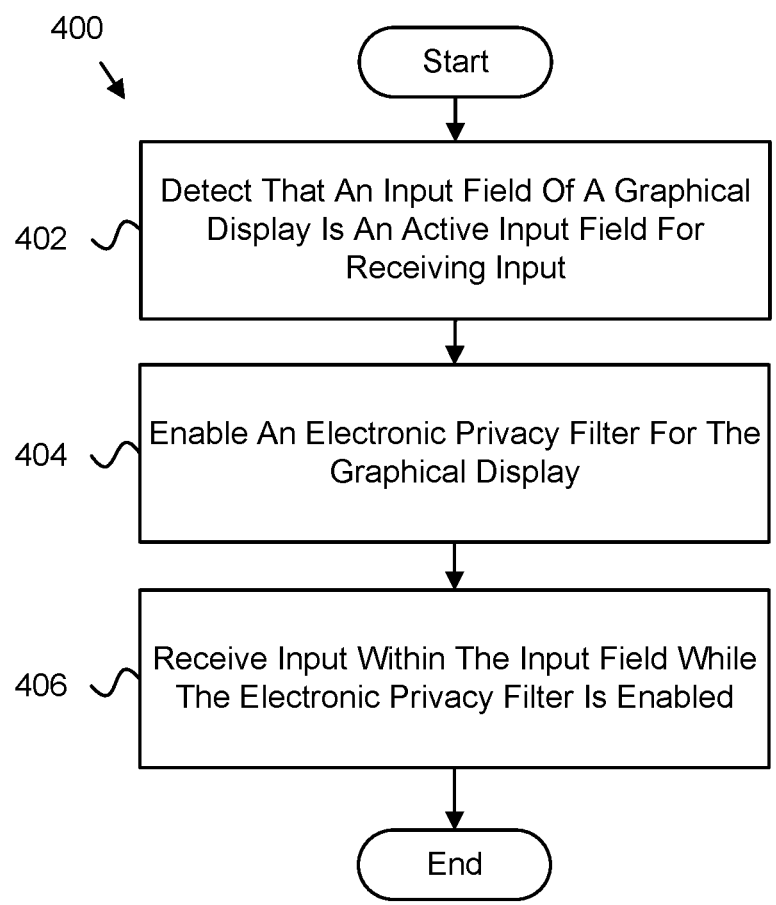
FIG. 4 is a schematic flow chart diagram illustrating one embodiment of a method for dynamic screen filtering.

FIG. 4 is a schematic flow chart diagram illustrating one embodiment of a method 400 for dynamic screen filtering. In one embodiment, the method 400 begins and the field module 202 detects 402 that an input field of a graphical display in an active input field for receiving input. In certain embodiments, the filter module 204 enables 404 an electronic privacy filter for the graphical display in response to the field module 202 detecting 402 the input filed being the active graphical field for receiving input. In further embodiments, the input receiving module 206 receives 406 input within the input field while the electronic privacy filter is enabled, and the method 400 ends.

Figure 5:
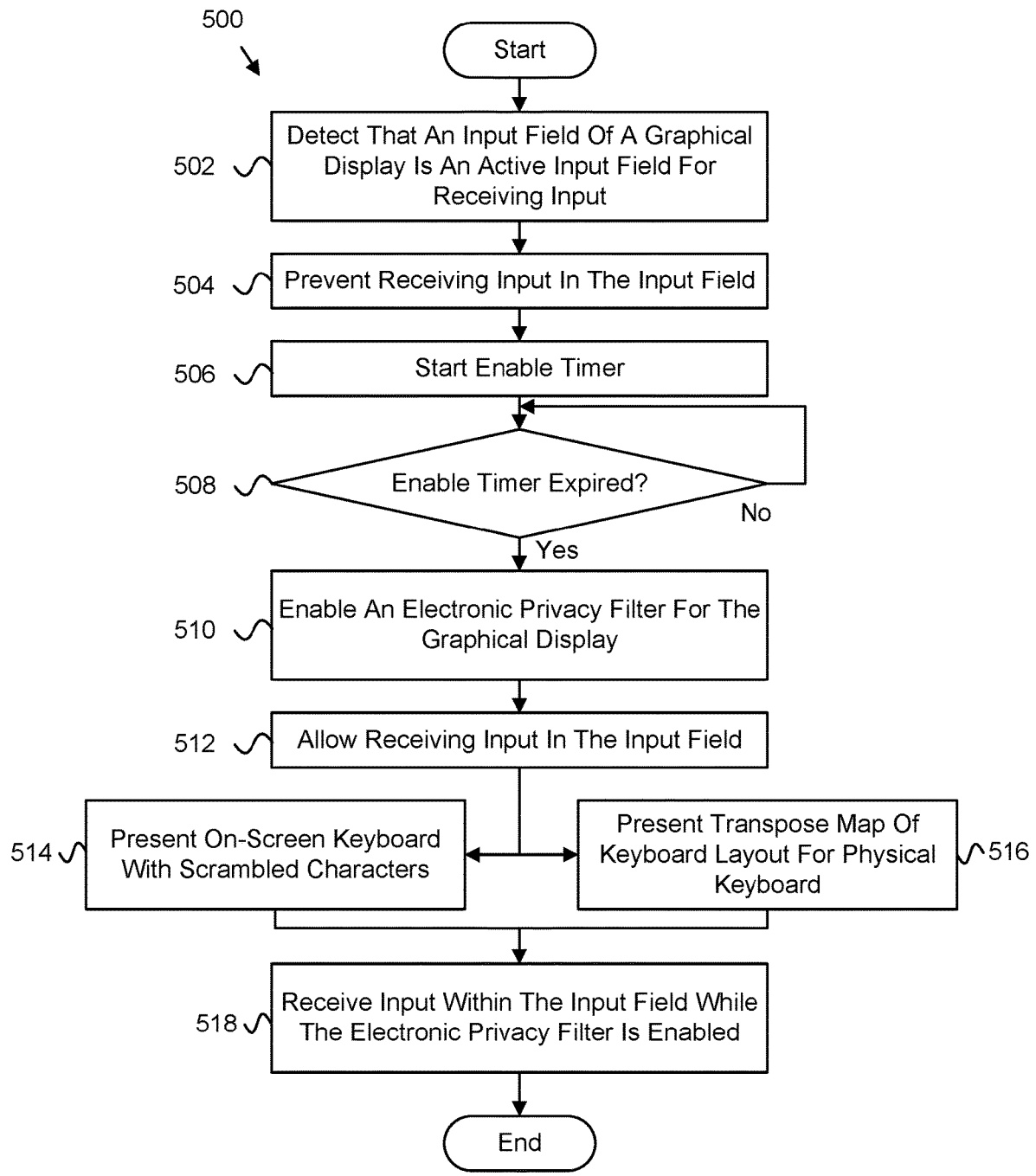
FIG. 5 is a schematic flow chart diagram illustrating one embodiment of another method for dynamic screen filtering.

FIG. 5 is a schematic flow chart diagram illustrating one embodiment of another method 500 for dynamic screen filtering. In one embodiment, the method 500 begins and the field module 202 detects 502 that an input field of a graphical display in an active input field for receiving input. In certain embodiments, the input receiving module 206 prevents 504 receiving input within the input field until the electronic privacy filter is enabled. In various embodiments, the timer module 304 starts 506 an enable timer in response to the field module 202 detecting 502 that an input field of a graphical display in an active input field for receiving input.

In certain embodiments, the timer module 304 determines 508 whether the enable timer has expired. If not, the timer module 304 may continue to check for expiration of the enabled timer. Otherwise, the filter module 204 enables 510 an electronic privacy filter for the graphical display. The input receiving module 206 may then allow 512 input to be received within the input field. To facilitate entering input in the input field, and to increase the security that the electronic privacy filter provides, the keyboard module 302 may present 514 an on-screen keyboard with scrambled characters (e.g., different than a standard layout such as a QWERTY layout) for entering input and/or may present 516 a transpose map of a different keyboard layout that corresponds to the keys of a physical keyboard (e.g., a transpose map that has a keyboard layout that is different than a standard layout such as a QWERTY layout). In certain embodiments, the input receiving module 206 receives 518 input within the input field while the electronic privacy filter is enabled, and the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
detect that an input field of a graphical display is an active graphical field for receiving input;
in response to detecting that the input field of the graphical display is the active graphical field for receiving input, dynamically enable an electronic privacy filter for the graphical display, the electronic privacy filter comprising a digital screen filter for the graphical display that reduces the viewing angle of the graphical display such that information presented on the graphical display is not visible from a periphery of the graphical display; and
receive input within the input field while the electronic privacy filter is enabled for the graphical display.

2. The apparatus of claim 1, wherein the code is further executable by the processor to prevent receiving input within the input field until the electronic privacy filter is enabled.

3. The apparatus of claim 1, wherein the code is further executable by the processor to disable the electronic privacy filter in response to the input field not being the active graphical field for receiving input.

4. The apparatus of claim 1, wherein the code is further executable by the processor to disable the electronic privacy filter in response to the input field comprising entered input not being visible within a display area of the graphical display.

5. The apparatus of claim 1, wherein the input comprises alpha-numeric characters received from at least one of a physical keyboard and an on-screen keyboard.

6. The apparatus of claim 5, wherein the code is further executable by the processor to present the on-screen keyboard with scrambled alpha-numeric characters such that the alpha-numeric characters are presented in a layout that is different than a QWERTY keyboard layout.

7. The apparatus of claim 5, wherein the code is further executable by the processor to present a transpose map of a keyboard layout that corresponds to the keys of the physical keyboard such that the alpha-numeric characters are presented in a layout that is different than a QWERTY keyboard layout.

8. The apparatus of claim 1, wherein the code is further executable by the processor to start an enable timer in response to the input field becoming the active graphical field and in response to the electronic privacy filter not currently being enabled, the electronic privacy filter being enabled in response to expiration of the enable timer.

9. The apparatus of claim 1, wherein the code is further executable by the processor to start a disable timer in response to the input field not being the active graphical field, the electronic privacy filter being disabled in response to expiration of the disable timer and in response to a different input field not becoming the active graphical field.

10. The apparatus of claim 1, wherein the input field comprises an input field for a web page presented within a web browser.

11. The apparatus of claim 1, wherein the input field comprises an input field for an operating system application.

12. The apparatus of claim 1, wherein the input field comprises an input field for a command line terminal.

13. The apparatus of claim 1, wherein the input field comprises an input field for receiving sensitive information, the sensitive information selected from the group consisting of a username, a password, financial information, personal identification information, and health information.

14. A method comprising:
detecting, by a processor, that an input field of a graphical display is an active graphical field for receiving input;
in response to detecting that the input field of the graphical display is the active graphical field for receiving input, dynamically enabling an electronic privacy filter for the graphical display, the electronic privacy filter comprising a digital screen filter for the graphical display that reduces the viewing angle of the graphical display such that information presented on the graphical display is not visible from a periphery of the graphical display; and
receiving input within the input field while the electronic privacy filter is enabled for the graphical display.

15. The method of claim 14, further comprising preventing receiving input within the input field until the electronic privacy filter is enabled.

16. The method of claim 14, further comprising disabling the electronic privacy filter in response to the input field not being the active graphical field for receiving input.

17. The method of claim 14, wherein the input comprises alpha-numeric characters received from at least one of a physical keyboard and an on-screen keyboard.

18. The method of claim 17, further comprising presenting the on-screen keyboard with scrambled alpha-numeric characters such that the alpha-numeric characters are presented in a layout that is different than a QWERTY keyboard layout.

19. The method of claim 17, further comprising presenting a transpose map of a keyboard layout that corresponds to the keys of the physical keyboard such that the alpha-numeric characters are presented in a layout that is different than a QWERTY keyboard layout.

20. A program product comprising a non-transitory computer readable storage medium that stores code executable by a processor, the executable code comprising code to perform:
- detecting that an input field of a graphical display is an active graphical field for receiving input;
- in response to detecting that the input field of the graphical display is the active graphical field for receiving input, dynamically enabling an electronic privacy filter for the graphical display, the electronic privacy filter comprising a digital screen filter for the graphical display that reduces the viewing angle of the graphical display such that information presented on the graphical display is not visible from a periphery of the graphical display; and
- receiving input within the input field while the electronic privacy filter is enabled for the graphical display.

* * * * *